(12) United States Patent
Fernandez (10) Patent No.: US 6,329,004 B1
(45) Date of Patent: Dec. 11, 2001

(54) COOKING METHOD AND APPARATUS

(75) Inventor: Juan Fernandez, Ridgefield Park, NJ (US)

(73) Assignee: Products of Tomorrow, Ridgefield Park, NJ (US)

( * ) Notice: Subject to any disclaimer, the term of this patent is extended or adjusted under 35 U.S.C. 154(b) by 0 days.

(21) Appl. No.: 09/606,197

(22) Filed: Jun. 29, 2000

(51) Int. Cl.[7] ............................. A21D 6/00; H05B 6/80
(52) U.S. Cl. ...................... 426/243; 426/289; 99/451; 99/498; 99/499; 99/508; 219/726; 219/729; 219/732; 219/757
(58) Field of Search ............................. 426/243, 289, 426/644; 99/451, 499, 508, 498; 219/726, 729, 732, 757

(56) References Cited

U.S. PATENT DOCUMENTS

| | | | |
|---|---|---|---|
| D. 342,187 | * | 12/1993 | Chen ........................... D7/503 |
| 4,133,996 | * | 1/1979 | Fread .......................... 219/725 |
| 4,280,032 | * | 7/1981 | Levinson ................... 219/10.55 |
| 5,293,021 | * | 3/1994 | Davis .......................... 219/728 |
| 5,432,324 | * | 7/1995 | Freewald ..................... 219/731 |
| 5,674,546 | * | 10/1997 | Barnes et al. ................. 426/120 |
| 5,807,597 | * | 9/1998 | Barnes et al. ................. 426/234 |

FOREIGN PATENT DOCUMENTS 1 027 869 U    9/1994 (ES) ............................. A47J/43/04

* cited by examiner

Primary Examiner—Nina Bhat
(74) Attorney, Agent, or Firm—Kilpatrick Stockton LLP (57) ABSTRACT

An improved container is provided for cooking eggs and the like in a microwave oven. The container includes a bottom cup having a top opening and a top cap configured to fit over the top opening. The container can also include a unique separator fitted within the bottom cup. The separator can include a cracker plate for cracking egg shells and/or at least one depending leg extending along an inside surface of the bottom cup to facilitate separation of cooked eggs. The container can also include a unique scrambler fitted within the top cap. Preferably, the scrambler is formed as a grid through which egg contents can pass when the container is shaken. In addition, a novel cradle can be provided to facilitate carrying and handling of a plurality of like containers. The preferred embodiments of the present invention enable a variety of egg dishes—e.g., poached eggs, scrambled eggs, omelets, etc.—to be easily and conveniently cooked in microwave and the like ovens with added health benefits, e.g., not requiring added fats or the like, and other advantages.

19 Claims, 10 Drawing Sheets

COOKING METHOD AND APPARATUS

BACKGROUND OF THE INVENTION

1. Field of the Invention

The present invention relates generally to cooking methods and devices and, more particularly, to cooking devices for cooking eggs and the like. Most particularly, the preferred embodiments of the present invention pertain to devices for cooking eggs and the like using microwave or the like energy.

2. Description of the Related Art

While a variety of cooking devices are known, there remains a continued need for improved cooking devices and especially for improved microwave oven or the like cooking devices and more especially for improved cooking devices for cooking eggs or the like with a microwave oven or the like.

The present invention is an improvement over, for example, the methods and devices shown in the following U.S. Pat. Nos. 5,807,597 (Process for Storing and Cooking an Omelet); 5,674,546 (Package for Storing and Cooking an Omelet); 5,293,021 (Egg Poacher for Microwave Oven); 4,908,487 (Egg Poacher for Microwave Oven); 4,413,167 (Microwave Egg Cooker); 4,280,032 (Egg Cooking in a Microwave Oven); 4,133,996 (Microwave Oven Egg Cooking Apparatus).

The related art contains a variety of deficiencies and does not provide various advantages, benefits and functions achieved by the present invention.

SUMMARY OF THE INVENTION

The present invention overcomes a variety of problems found in existing devices and also provides significant advantages, benefits and functions not available with existing devices.

According to preferred embodiments of the present invention, an improved container is provided for cooking eggs and the like in a microwave oven. Preferably, the container includes a bottom cup having a top opening and a top cap configured to fit over the top opening. Preferably, the container also includes a unique separator fitted within the bottom cup. Preferably, the separator includes a cracker plate for cracking eggshells and/or at least one depending leg extending along an inside surface of the bottom cup to facilitate separation of cooked eggs. In the most preferred embodiments, the separator includes both of these features combined into a single integrally formed piece (e.g., using an injection molded plastic or the like). The container preferably also includes a unique scrambler fitted within the top cap. Preferably, the scrambler is formed as a grid through which egg contents can pass when the container is shaken. In addition, a novel cradle can be provided to facilitate carrying and handling of a plurality of like containers. In addition, a unique egg strainer that is configured to rest upon the bottom cup is also preferably included.

The preferred embodiments of the present invention enable a variety of egg dishes—e.g., poached eggs, scrambled eggs, omelets, etc.—to be easily and conveniently cooked in microwave or the like ovens with added health benefits, e.g., not requiring added fats or the like, with cost reduction and manufacturing advantages, with aesthetic advantages and with other significant advantages.

In one illustrative embodiment of the invention, a microwavable container for cooking eggs can be provided which includes: a bottom cup having a top opening; a top cap configured to fit over the top opening; a separator fitted within the bottom cup, the separator including a cracker plate, and the separator including at least one depending leg extending along an inside surface of the bottom cup; and a scrambler fitted within the top cap, the scrambler having a grid through which egg contents can pass when the container is shaken.

In another illustrative embodiment of the invention, a microwavable container assembly for cooking eggs can be provided which includes: a bottom cup having a top opening; a top cap releasably connected to the bottom cup over the top opening; and a separator fitted within the bottom cup, the separator including a generally vertical cracker plate for cracking eggs.

In another illustrative embodiment of the invention, a microwavable container for cooking eggs can be provided that includes: a bottom cup having a top opening; a top cap releasably connected to the bottom cup over the top opening; and a scrambler having a grid through which egg contents can pass when the container is shaken.

According to other embodiments of the invention, novel methods of cooking eggs and the like are provided. In one illustrative embodiment, a method of cooking an egg in a microwave oven is set forth which includes: providing a microwavable container for cooking eggs having a bottom cup with a top opening, a top cap releasably connectable to the bottom cup over the top opening, and a separator fittable within the bottom cup, the separator including a generally vertical cracker plate; impacting a whole egg against the cracker plate so as to crack the shell of the egg; depositing the internal egg contents inside the bottom cup without the egg shell; connecting the top cap to the bottom cup to form a substantially enclosed container having the internal egg contents therein; and cooking the container along with its internal egg contents within a microwave oven.

According to another illustrative embodiment of the invention, a method of cooking an egg in a microwave oven is set forth which includes: providing a microwavable container for cooking eggs having a bottom cup with a top opening, a top cap releasably connectable to the bottom cup over the top opening, and a scrambler having a grid through which egg contents can pass; depositing internal egg contents inside the bottom cup without the egg shell; connecting the top cap to the bottom cup to form a substantially enclosed container having the internal egg contents therein; shaking the container such that the internal egg contents is scrambled by impacting the scrambler; and cooking the container along with its internal egg contents within a microwave oven.

The above and other embodiments, features, methods and advantages will be described further herein-below with reference to the accompanying figures.

BRIEF DESCRIPTION OF THE DRAWINGS

The accompanying figures illustrate some of the preferred embodiments of the present invention. These figures are not intended to limit the scope of the invention to the embodiments shown, but are provided for illustrative purposes.

DETAILED DESCRIPTION OF THE PREFERRED EMBODIMENTS

Figure 1:
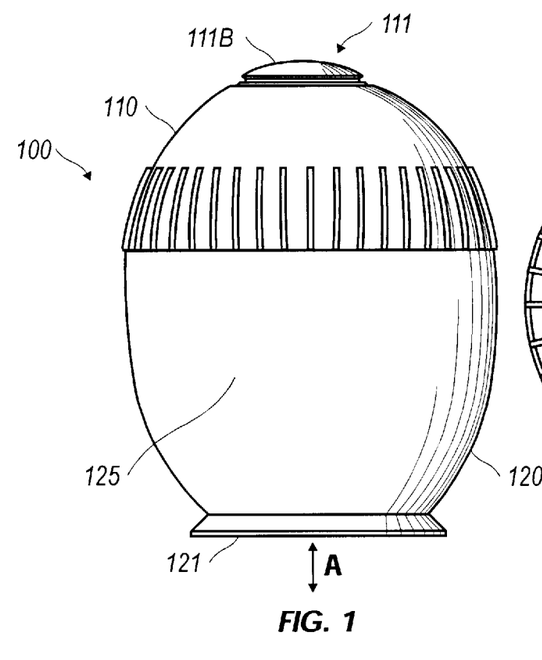
FIG. 1 is a side view of a cooking device according to an embodiment of the invention.

According to a preferred embodiment of the invention, as shown in FIG. 1, a cooking container 100 is provided having a bottom cup section 120 and a top cap section 110. As discussed below, the cooking container 100 is preferably filled with a food product, e.g., one or more egg, and placed within a microwave or the like oven to cook the food product.

Figure 4:
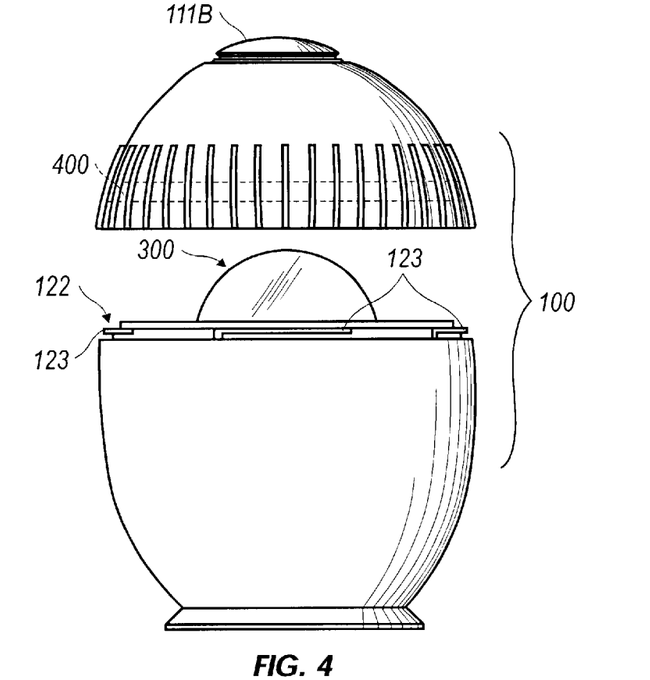
FIG. 4 is a side view of the cooking device shown in FIG. 1 with the top section raised above the bottom section.
Figure 5:
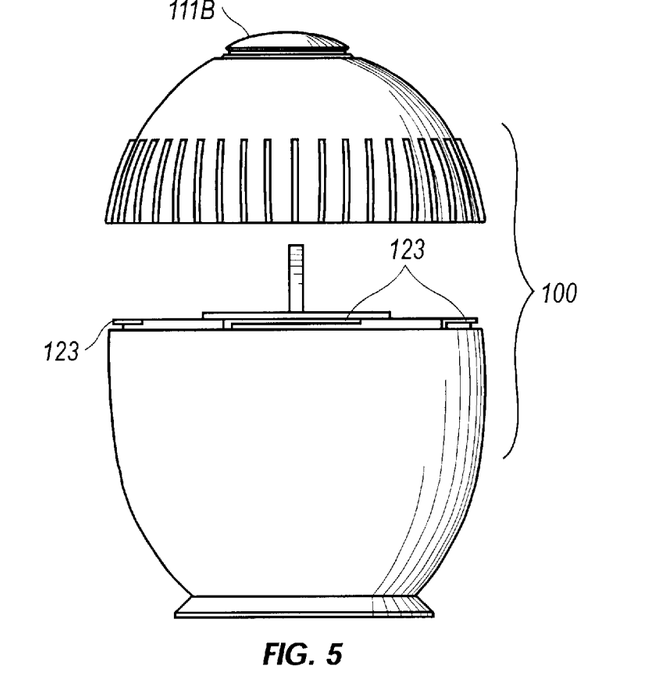
FIG. 5 is a side view of the cooking device shown in FIG. 1, taken from the right side of the view in FIG. 4, with the top section raised above the bottom section.

The top section 110 and the bottom section 120 are preferably releasably connectable to one another such that they can be connected, as shown in FIG. 1, or disconnected, as shown in FIGS. 4 and 5.

The bottom section 120 preferably includes a peripheral sidewall 125, a floor 126 and a base 121 configured to allow the container to rest upon a generally flat surface.

Figure 13:
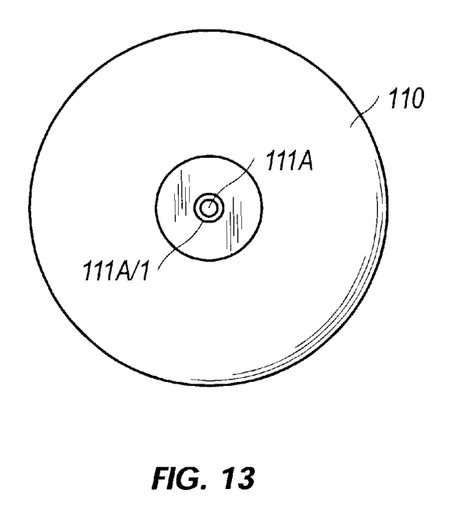
FIG. 13 is a top view of the top section shown in FIG. 1 with the valve cap removed to reveal the valve hole.
Figure 14:
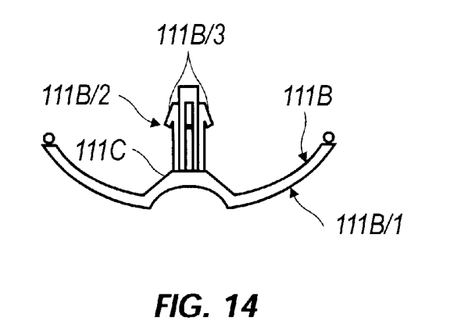
FIG. 14 is a partly cross-sectional side view of the valve cap shown in FIG. 15, taken along the line 14—14 shown in FIG. 15.
Figure 15:
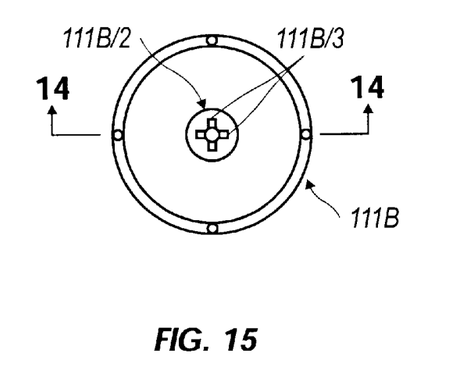
FIG. 15 is a bottom view of the valve cap shown in FIG. 1.

The top section 110 is preferably formed generally as an inverted cup and preferably includes a valve 111. As shown in FIG. 13, the valve 111 is preferably a safety pressure valve that opens upon a predetermined internal pressure within the container. Preferably, the valve includes an air hole 111A formed through the top section 110. As best shown in FIGS. 1, 14 and 15, the valve 111 preferably also includes a valve cap 111B. In the illustrated embodiment, the valve cap 111B preferably includes a generally arcuate portion 111B/1 and a shaft portion 111B/2. Preferably, the shaft portion includes radial ribs 111B/3, the outer diameters of which are sized so as to fit within the valve hole 111A. When the valve cap 111B is filly seated, the outer portion 111C is preferably generally at or near the surface 111A/1 around the hole 111A. Preferably, when internal pressure increases, the cap 111B can move outward such that the outer portion 111C is spaced from the surface 111A/1 and air flow increases between the radial ribs 111B/3 through the valve hole 111A.

Figure 8A:
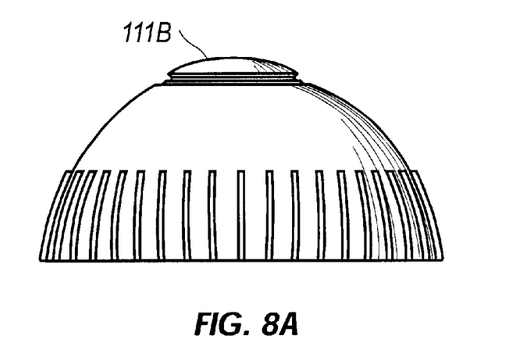
FIG. 8(A) is a side view of a top section having a hinged valve cap in an open position.
Figure 8B:
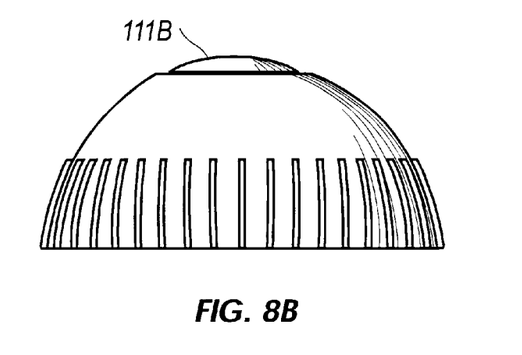
FIG. 8(B) is a side view of the top section shown in FIG. 8(A) with the valve cap in a closed position.
Figure 9:
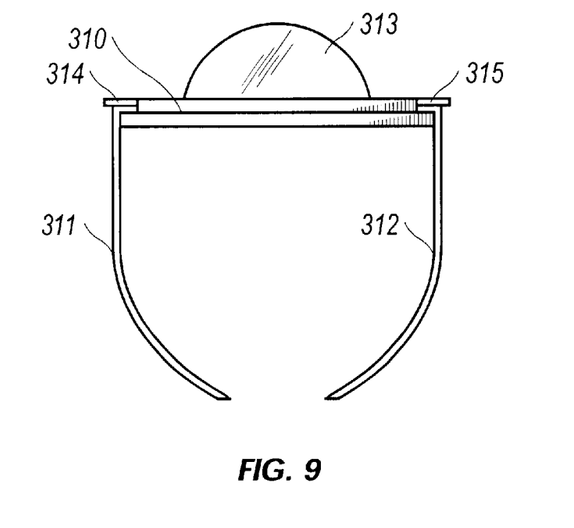
FIG. 9 is a broad side view of the separator shown in FIG. 8.
Figure 10:
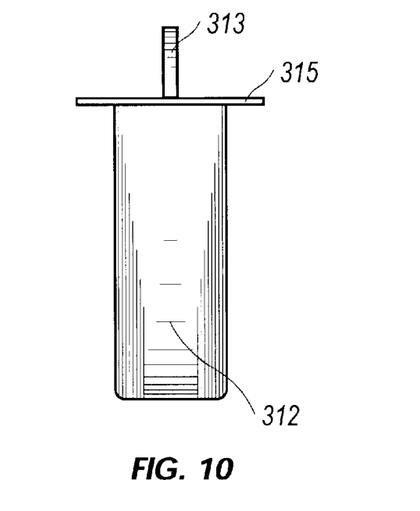
FIG. 10 is a side view of the separator taken from the right side of FIG. 9.
Figure 11:
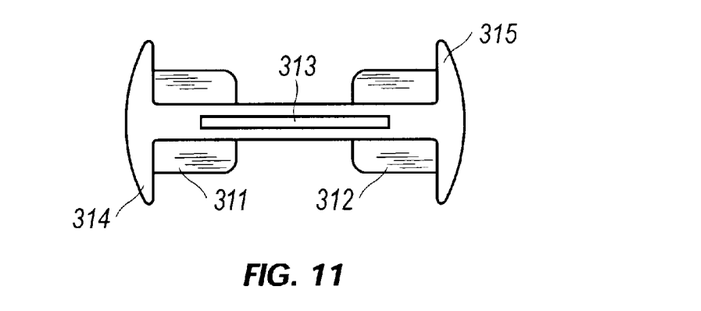
FIG. 11 is a top view of the separator shown in FIG. 9.
Figure 12:
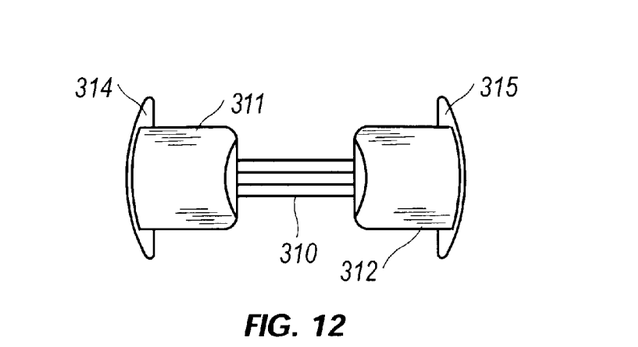
FIG. 12 is a bottom view of the separator shown in FIG. 9.

In another, more preferred embodiment, the valve is constructed to be in an open state when no external force is applied and to be in a closed state when an external force (e.g., manual pressure) is applied. In one preferred construction, the valve includes a hinge design. A preferred construction of this more preferred embodiment is illustrated in FIGS. 8(A)–8(B). As shown, the top section 110' includes a valve hole 111A' and a valve hinge h that is connected to a valve cap 111'. Preferably, the valve hinge h is integrally formed, e.g., molded, with both the top section 110' and the valve cap 111'. Preferably, the valve cap is normally in a open state as shown in FIG. 8(A) so that air can be released from the interior of the container 100. And, preferably, the valve cap 111' can be pressed downward so as to cover the valve hole 111A' in order to close the valve. As shown, the valve is preferably closeable manually, e.g., via a user's hand(s) or finger(s) F. In this manner, as discussed below, in order to make scrambled eggs, for example, a user can place the egg contents within the container 100, press the valve cap 111' into the closed position, and then shake the container. The contents, thus, will not spill out due to the closed valve cap 111'. Then, upon releasing the valve cap 111', the valve cap 111' preferably automatically returns to the position shown in FIG. 8(A)—e.g., such as due to the resiliency of the hinge h. In this manner, the valve hole 111 A' can be ensured to remain open during heating. Among other things, ensuring that the valve cap 111' returns to the position shown in FIG. 8(A) unless forced into the position shown in FIG. 8(B) helps to avoid the potential of extensive internal pressure buildup during cooking, such as, for example, reducing the potential that the hole 111A' can become inadvertently clogged. As shown, the hole 111A' preferably has a surrounding annular wall 111A' that extends substantially up to or near the interior surface of the valve cap 111' in the closed position. In one non-limiting illustrative embodiment, the diameter of the valve hole 111A' can be, e.g., between about ¼ inch and ⅓ inch. Other embodiments could use substantially smaller valve holes or larger valve holes.

Figure 2:
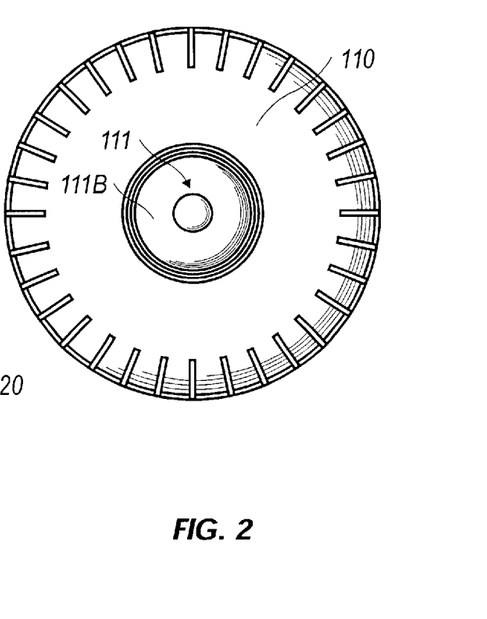
FIG. 2 is a top view of the cooking device shown in FIG. 1.
Figure 3:
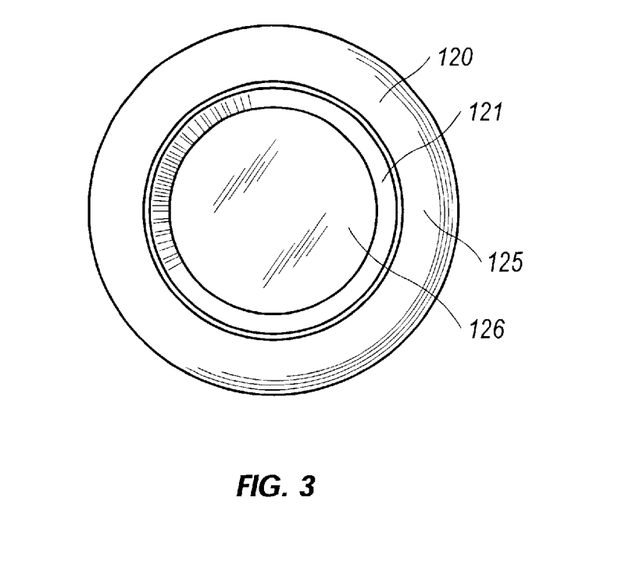
FIG. 3 is a bottom view of the cooking device shown in FIG. 1.

In the embodiment shown in FIGS. 1–2, the top section 110 preferably also includes a plurality of outwardly protruding friction ribs to facilitate manual handling and/or twisting of the top section 110 relative to the bottom section 120. In alternative embodiments, other friction means could be used to facilitate manual handling such as pimples, dimples, grooves and/or high friction materials.

Together, the top section 110 and the bottom section 120 can thus form a substantially hollow and substantially enclosed container 100. In order to releasably connect the top section 110 to the bottom section 120 any releasable connection can be provided. In one preferred embodiment, the bottom section 120 includes a plurality of overhanging shoulders 123 formed at the top end 122 thereof and the top section 110 includes a plurality of corresponding outward tabs 113 (see FIG. 7), whereby the top section 110 and the bottom section 120 can be attached by placing the top section 110 over the bottom section 120 and rotating the top section 110 relative to the bottom section 120 such that the tabs are located underneath the shoulders 123. In another embodiment, the top section 110 and the bottom section 120 can include respective helical threads for a threaded or screw-type engagement and/or disengagement. In yet another embodiment, the top section 110 and the bottom section 120 can include respective snap-fit elements so as to snap-fit together. In yet other embodiments, the device can include clips, locks or other means to engage the top section to the bottom section.

Figure 6:
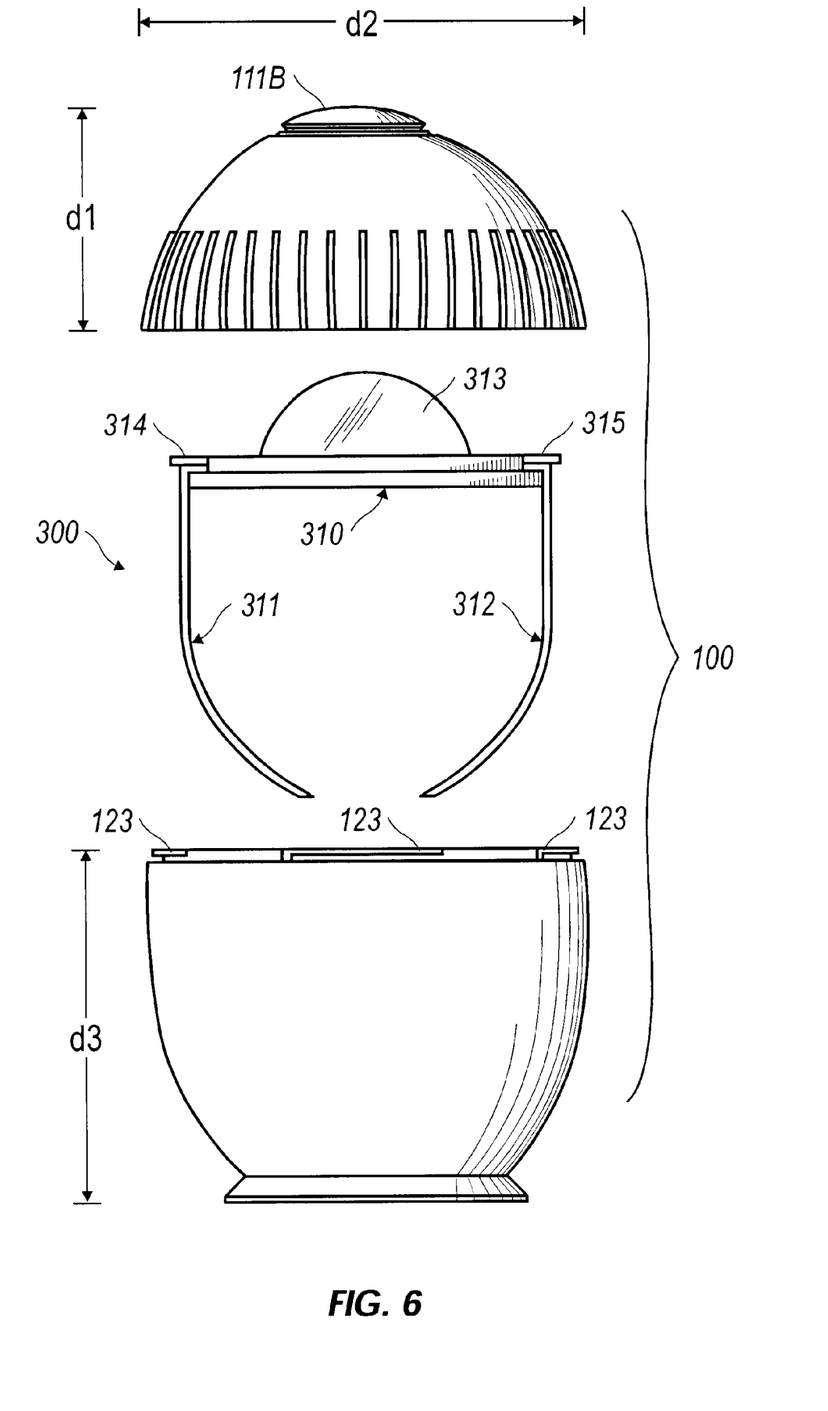
FIG. 6 is an exploded side view of the cooking device shown in FIG. 1 with the top section raised above the bottom section and with the separator removed from the bottom section.

According to one preferred embodiment of the invention, the device includes an internal separator 300 as best shown in FIG. 6. The separator 300 is preferably fitted inside the bottom section 120 as shown in FIGS 4, 5 and 7(D).

The separator 300 preferably includes a lateral member 310 that extends substantially across the diameter of the bottom section 120. The lateral member preferably includes first and second legs 311 and 312, respectively, extending downward from the lateral member 310 into the bottom section 120 and configured (e.g., curved in the illustrated embodiment) to correspond substantially to an internal surface of the bottom section 120. In this manner, when the separator 300 is rotated within the bottom section 120, the legs 311 and 312 can slide or move generally along the internal surface of the bottom section 120 so as to facilitate separation of food product or to scrape food product from the internal surface. While, as shown, two legs are preferred, other embodiments can include three or more legs or even just one leg. As also shown, the lateral member also preferably includes a cracker plate 313 extending upward. In a preferred embodiment, the cracker plate 313 preferably has a substantially arcuate shape (e.g., semi-circular). In alternative embodiments, the cracker plate 313 can have another shape, such as, for example, a generally triangular shape, a generally rectangular shape or another configuration. The width of the cracker plate is preferably selected so as to easily split an egg. For example, in some illustrative embodiments, the width of the cracker plate is preferably between about 1 to 4 millimeters, and, more preferably, between about 2 to 3 millimeters. Moreover, the separator 300 preferably also includes stabilizing flanges 314 that are configured to rest upon the top end 122 of the bottom section 120 to stabilize the separator 300.

As described in further detail below, in the preferred embodiments, the separator 300 serves one or more of the following two functions: first, it supports the cracker 313 which facilitates manual eggshell cracking and separation prior to cooking; and second, it supports the legs 311, 312 which facilitate separation or scraping of the cooked food product from the internal surface of the bottom section 120 after cooking.

Figure 7A:
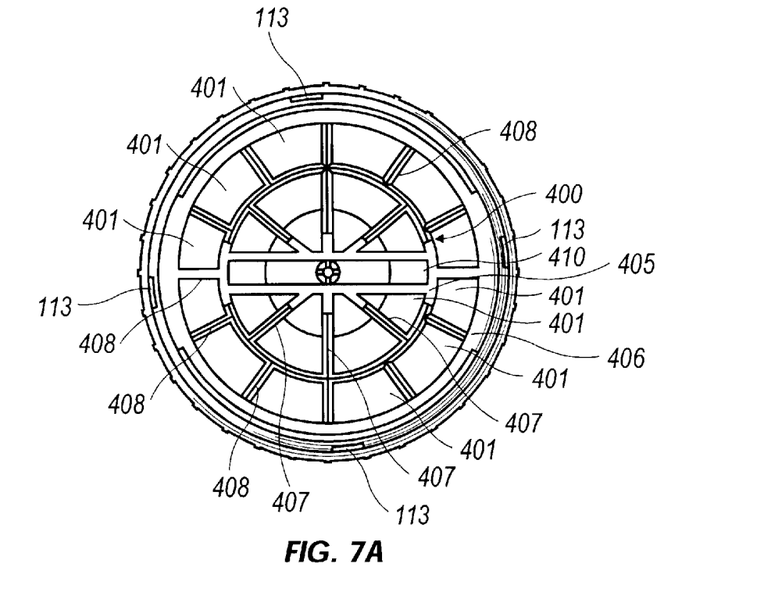
FIG. 7(A) is a bottom view of the top section with a scrambler fitted therein.
Figure 7B:
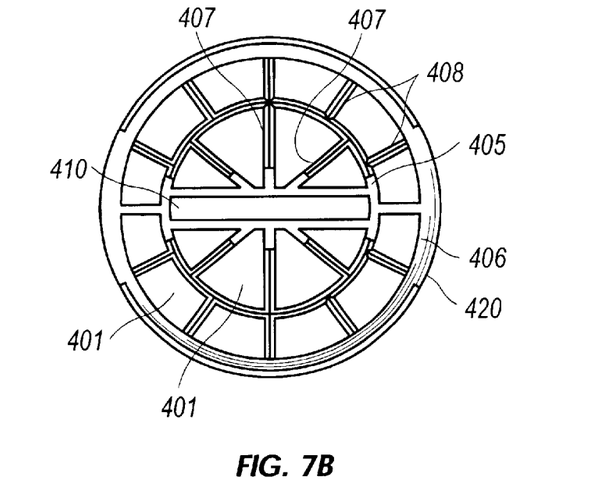
FIG. 7(B) is a bottom view of the scrambler shown in FIG. 7(A) outside of the top section.
Figure 7C:
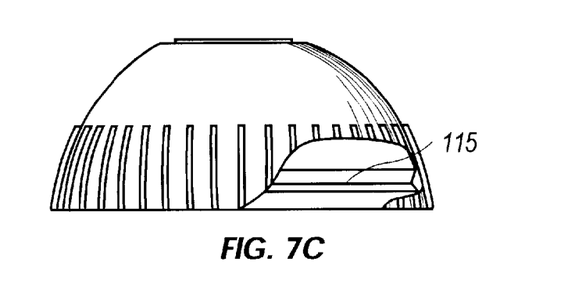
FIG. 7(C) is a partly broken side view of the top section 110 showing an internal annular ridge for snap-fitting the scrambler into the top section 110 according to a preferred embodiment.
Figure 7D:
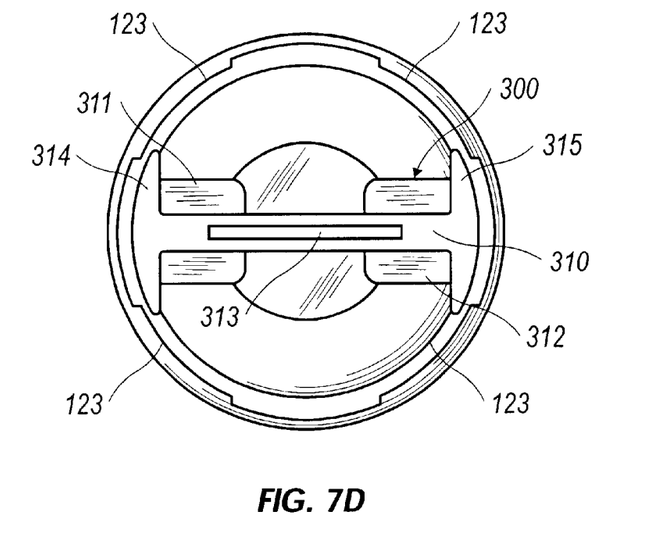
FIG. 7(D) is a top view of the bottom section with a separator fitted therein.

According to a preferred embodiment of the invention, the device also includes an internal scrambler 400, as shown in FIGS. 4 and 7(A)–7(C). Preferably, the scrambler 400 is removably receivable inside the top section 110. More preferably, the scrambler 400 is snap-fitted into place inside the top section 110. As shown in FIG. 7(C), the internal surface of the top section 110 preferably includes an annular ridge 115 that operates to snap-fit over a peripheral edge 420 of the scrambler 400.

As shown, the scrambler 400 preferably includes a plurality of openings 401 through which food contents, e.g., eggs, can pass. In the illustrated embodiment, the openings 401 are formed within a grid of spaced apart bar members. In particular, the preferred illustrated scrambler is formed as a grid having a plurality of annular bars (e.g., inner and outer annular bars 405 and 406, respectively) and a plurality of radial bars (e.g., inner and outer radial bars 407 and 408, respectively). As shown, in a preferred embodiment, the scrambler 400 also includes a central slot 410 sized to receive the cracker 313 when the top section 110 is connected to the bottom section 120. Preferably, the separator 300 is rotatable within the bottom section 120 (i.e., the separator can rotate when placed within the bottom section 120), facilitating concurrent placement of the cracker 313 within the slot 410 and connection of the top section 110 to the section bottom 120 as well as facilitating separation of cooked food contents from the internal surface of the bottom section 120. In alternative embodiments, the cracker 313 can be made so as not to extend into the scrambler when assembled so that a receiving slot can be omitted.

Figure 16:
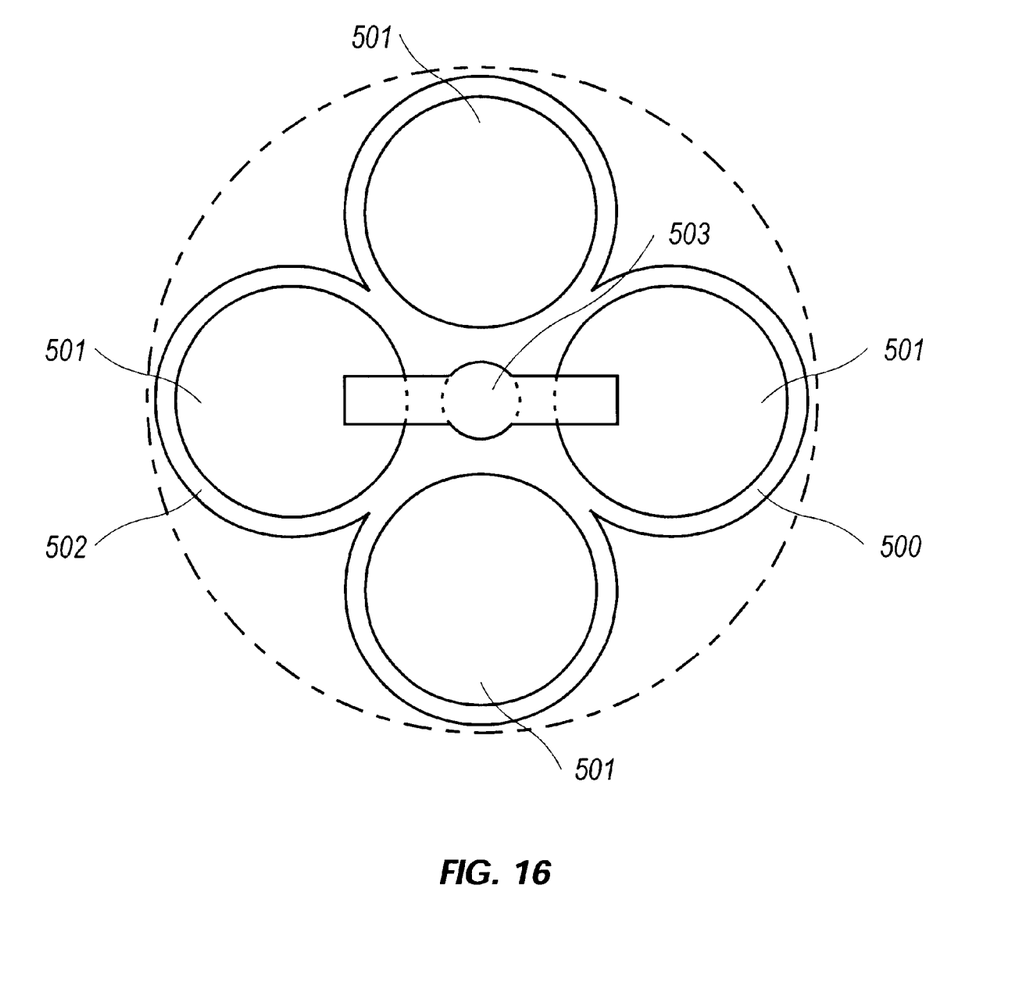
FIG. 16 is a top view of a cradle according to a preferred embodiment of the invention.
Figure 17:
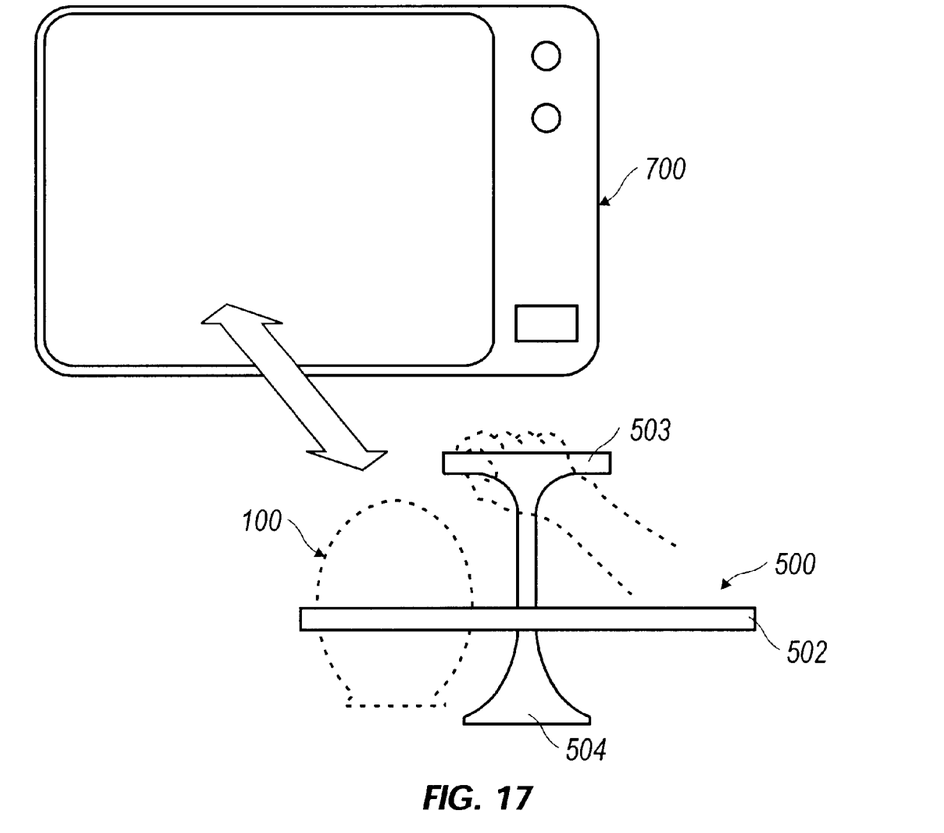
FIG. 17 is a side view of the cradle shown in FIG. 16.

FIGS. 16 and 17 show an optional cradle 500 that can be provided in some preferred applications of the invention. As shown, the cradle 500 is preferably configured to hold a plurality of cooking containers 100 of the present invention. In the example shown in FIG. 16, the cradle has four receiving openings 501 for receiving respective cooking containers 100. Preferably, each receiving opening 501 is dimensioned to snugly contact peripheral and lower surfaces of a respective container 100 for secure support. The cradle 500 can be formed in a variety of configurations depending on circumstances and should preferably enable quick and easy placement, support and/or removal of cooking containers 100. As discussed further below, the cradle 500 can be used, for example, to place, support, remove and/or transport a plurality of cooking containers 100 to and/or from a microwave oven 700 or the like. As shown in FIGS. 16 and 17, the cradle preferably includes a retaining portion 502 and a handle portion 503. Preferably, the handle portion is detachably connectable to the retaining portion 502, such as via a snap-fit connection or the like connection. In an alternate embodiment, the cradle could also include a base 504 (shown in dashed lines). The base 504 could be integrally formed with the retaining portion, detachably connectable or otherwise attached. The retaining portion 502, the handle portion 503 and/or the base 504 could be configured as desired based on circumstances. For example, to minimize the material requirements, the retaining portion 502 preferably includes narrow bands extending around the openings 501, as shown, but the retaining portion could also have, for example, a circular (e.g., as shown in dashed lines) or other shape plate or disk having cut-out receiving holes 501.

Figure 18:
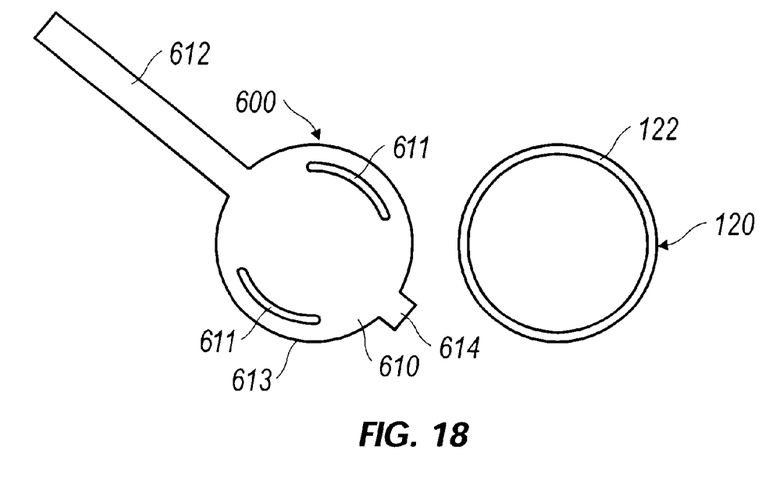
FIG. 18 is a top view of a fluid separator proximate a bottom section of a cooking device according to a preferred embodiment of the invention.
Figure 19:
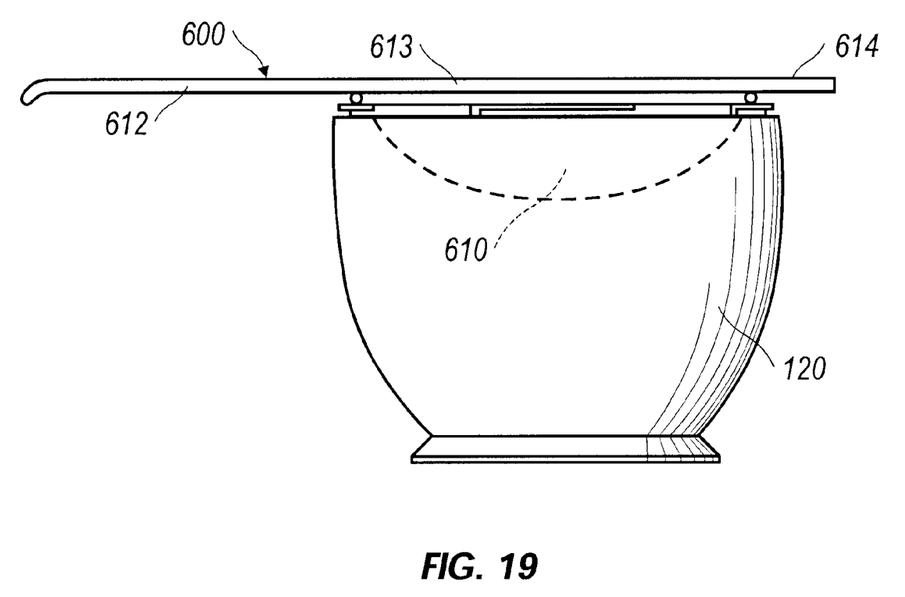
FIG. 19 is a side view of the fluid separator and the bottom section shown in FIG. 18 with the fluid separator placed over the bottom section.

FIG. 18 shows an optional fluid separator 600 that can be provided in some preferred applications of the invention. Preferably, the separator 600 is sized to fit over the top opening in the bottom section 120. The separator 600 is preferably formed with a spoon-like portion 610 and a handle 612. The spoon-like portion 610 is preferably sized to rest securely upon the upper end 122. The spoon-like portion 610 also preferably includes through-holes 611 that allow fluids with certain higher viscosities to pass through (e.g., egg whites) while retaining less viscous fluids (e.g., egg yolks). In this manner, the device can be readily used to separate egg yolks from egg whites to, for example, make egg white omelets or the like. To facilitate supporting the separator 600 upon the bottom section 120, the separator preferably includes an outer flange portion 613 and/or an extension tab 614 that rest(s) upon the top surface 122 of the bottom section 120. Preferably, the through-holes 611 are sufficiently within the circumference of the top opening of the bottom section 120 so that fluids passing through are readily received in the bottom section 120. In the illustrated embodiment, a plurality of wider through holes 611 are formed proximate the perimeter (three shown), while a plurality of smaller through holes 611 are formed proximate the center. The central holes are preferably generally V-shaped near the bottom as shown to help "cut" the egg whites faster. Although the separator 600 is preferably sized to rest upon the bottom 120, it is not required to do so in other embodiments.

Most preferably, various elements of the cooking apparatus (including, as some preferred examples, the top section 110, the bottom section 120, the separator 300, the scrambler 400 and/or the cradle 500) are formed of microwave compatible materials, including certain plastics, glasses, ceramics and/or other known microwave compatible materials. Most preferably, the various elements are made with injection molded plastic materials. Preferably, the materials used are also dishwasher compatible materials such that the device components can be readily washed in an automatic dishwasher or the like.

While the container 100 preferably has a shape generally as shown—e.g., generally egg-shaped—in other embodiments, the container 100 can have a variety of other configurations. For example, the container could be spherical, or cylindrical, or box-shaped (e.g., cubic), or it could have any other appropriate shape depending on circumstances.

In one preferred construction of the embodiment shown in FIG. 1, the cooking container 100 is sized to easily cook a single egg. In some preferred constructions, by way of example only, the various elements of the cooking container 100 can be dimensioned substantially in proportion to that shown in the figures. With reference to FIG. 6, in some preferred constructions, the cooking container can have a dimension d1 of between about 3 to 5 centimeters (e.g., generally about 4 centimeters in the illustrated example), a distance d2 of between about 5 ½ to 7 ½ centimeters (e.g., generally about 6 ½ centimeters in the illustrated example) and a distance d3 of between about 6 to 8 centimeters (e.g., generally about 7 centimeters in the illustrated example). In other embodiments, various other dimensioned can be used. Preferably, the bottom section 120 is substantially large enough to contain the entire food contents (e.g., one or two eggs, etc.) and the top section 110 is substantially large enough to receive a scrambler and to accommodate some food contents, e.g., eggs, therein during scrambling and/or to accommodate an upwardly standing cracker plate 313.

While the most preferred embodiments are sized so as to cook about one or two eggs, various embodiments could be sized to cook a plurality of eggs—e.g., some embodiments can be sized to cook 2 eggs, some embodiments can be sized to cook 3 eggs, or some embodiments could be sized to cook greater than 3 eggs. Preferably, the containers are sized so as to fit within common household microwave ovens.

A number of preferred methods of using preferred embodiments of the present invention are discussed below.

According to a first method of cooking with the present invention, a user first manually strikes a whole egg against a cracker plate 313 positioned over the bottom section 120 as shown in FIGS. 4 and 5. The cracker plate operates to sever the shell of the egg so that the user can split the shell in half and allow the egg contents to drop into the bottom section 120. Then, the user can discard the split shell. Next, the user places the top section 110 over the bottom section 120 and connects the sections together to form an enclosed container 100. Then, the user places the entire container 100 within a microwave or the like oven for a predetermined time period and intensity level, whereby the contents are cooked within the container 100. Then, the user removes the container 100 from the oven, disconnects the top section 110 and rotates the separator 300 so that the legs 311 and 312 facilitate separation of the egg contents. Then, the user removes the separator 300 from the bottom section to facilitate dispensing of the cooked contents. In this manner, the present invention can preferably be used to create, as one example, a poached egg or a cooked egg having a substantially intact yolk surrounded by egg white.

According to another method that can be performed in embodiments of the invention including a scrambler 400, the invention can be used to create scrambled eggs. In this novel method, the scrambler 400 is inserted into the top section 110. Then, after placing egg contents into the bottom section 120 and placing the top section 110 thereover, the user manually shakes the container 100 such that the egg contents passes back-and-forth through the scrambler 400. For example, a user preferably grasps the container 100 in one or two hands and shakes it up-and-down generally along a longitudinal axis of the container in the direction of the arrows A shown in FIG. 1. Thereafter, the container 100 is placed within the microwave or the like oven. The cooking and emptying of the contents can be performed as described above. In this manner, scrambled eggs can be easily produced.

According to other embodiments, additional contents can be added to the eggs prior to cooking so as to create an omelet or the like (e.g., the contents are preferably added after the user shakes the contents to produce scrambled-styled eggs). For example, bacon, cheese and/or vegetables such as peppers, onions, tomatoes or the like can be added.

In embodiments wherein a cradle 500 is provided along with a plurality of containers 100, preferably each container 100 is filled with desired contents (e.g., whether scrambled, combined with other foods or the like) and the cradle 500 is used to carry the containers 100 and place the same within a microwave or the like oven 700, as shown in FIG. 17. Then, the cradle 500 and containers 100 are subjected to microwave or the like heating within the oven at, for example, a predetermined intensity level and time period. Then, the cradle 500 is used to remove the finished product from the microwave or the like oven. Thereafter, the contents within the containers 100 can be placed onto plates and served or the cradle 500 and/or containers 100 can be placed directly at a table, e.g., a breakfast table, so that individuals can handle individual containers for self-service or the like. That is, because the containers 100 and the cradle 500 have a unique design and are very user friendly, instead of having the host or server empty the containers prior to serving, the containers 100 can be served directly to guests while allowing the guests to empty respective containers and/or to remove a respective container from the cradle.

Various methods that can be performed according to the present invention are set forth throughout this disclosure and additional methods should be apparent to those in the art based on this disclosure.

While the present invention has been described in reference to the above-described preferred embodiments, the present invention is not intended to be limited thereto, but is intended to encompasses all modifications and adaptations thereof as would be understood by those in the art based on this disclosure. In addition, various aspects of the embodi-

What is claimed is:

1. A microwavable egg-cooking container, comprising:
   a bottom cup having a top opening;
   a top cap configured to fit over said top opening;
   a separator fitted within said bottom cup,
      said separator including a cracker plate, and
      said separator including at least one depending leg extending along an inside surface of said bottom cup; and
   a scrambler fitted within said top cap,
      said scrambler having a grid through which egg contents can pass when the container is shaken.

2. The microwavable egg-cooking container of claim 1, wherein said separator includes a lateral member and two depending legs at opposite sides of said lateral member.

3. The microwavable egg-cooking container of claim 2, wherein said cracker plate extends generally vertically upward along a generally central portion of said lateral member.

4. The microwavable egg-cooking container of claim 1, wherein said scrambler is snap-fit into said top cap.

5. The microwavable egg-cooking container of claim 1, wherein said top cap is releasably connected to said bottom cup.

6. A method of cooking an egg in a microwave oven, comprising:
   providing a microwavable container for cooking eggs having a bottom cup with a top opening, a top cap releasably connectable to said bottom cup over said top opening, and a separator fittable within said bottom cup, said separator including a generally vertical cracker plate;
   impacting a whole egg against the cracker plate so as to crack the shell of the egg;
   depositing the internal egg contents inside the bottom cup without the egg shell;
   connecting the top cap to the bottom cup to form a substantially enclosed container having the internal egg contents therein; and
   cooking the container along with its internal egg contents within a microwave oven.

7. The method of claim 6, further including providing said separator with at least one depending leg and, after cooking, rotating the separator and removing the separator from the bottom cup to facilitate separation and dispensing of the cooked internal egg contents.

8. The method of claim 7, further including providing said separator with a lateral member and two depending legs at opposite sides of said lateral member.

9. The method of claim 8, wherein said cracker plate extends generally vertically upward along a generally central portion of said lateral member.

10. The method of claim 6, further including placing a scrambler within said container prior to cooking and shaking said container such that the internal egg contents is scrambled by impacting the scrambler.

11. The method of claim 10, further providing that said scrambler is snap-fit into said top cap.

12. A method of cooking an egg in a microwave oven, comprising:
   providing a microwavable container for cooking eggs having a bottom cup with a top opening, a top cap releasably connectable to said bottom cup over said top opening, and a scrambler having a grid through which egg contents can pass;
   depositing internal egg contents inside the bottom cup without the egg shell;
   connecting the top cap to said bottom cup to form a substantially enclosed container having the internal egg contents therein;
   shaking the container such that the internal egg contents is scrambled by impacting the scrambler; and
   cooking the container along with its internal egg contents within a microwave oven.

13. The method of claim 12, further including providing a cradle that holds at least two said containers at a time for easy handling before, during, and after cooking.

14. The method of claim 12, further including providing a fluid separator that is removably mountable over the top opening in the bottom cup.

15. The method of claim 12, further providing a separator having at least one depending leg extending along an inside surface of said bottom cup.

16. The method of claim 12, further including a cradle having a plurality of container receiving openings, with said container being receivable inside said openings.

17. The method of claim 12, further comprising:
   including base means proximate a bottom of said container;
   including ventilation means at a top of the top cap;
   including means for separating the eggs from the bottom cup after cooking, said means having two depending legs extending downward along the sides of the bottom cup in a curved manner so as to substantially match an inside shape of the bottom cup;
   including an arcuate cracker plate extending upward and disposed centrally over in the lower cup, and connect to said depending legs.

18. The method of claim 17, further comprising:
   including a fluid separator that can be fittingly placed over said bottom cup for straining egg yoke contents from egg white contents via a central concave yoke holding portion and at least two peripheral through-holes for allowing the egg whites to pass, said fluid separator having a handle portion and an extension tab opposite said handle portion, the handle portion and the extension tab combining to support the fluid separator on the top of the bottom cup.

19. The method of claim 17, further comprising:
   including a cradle having a plurality of container receiving openings, with said at least one container being receivable inside of said openings and having a handle extending generally above a central axis of the cradle.

* * * * *